United States Patent
Armstrong

(10) Patent No.: US 8,824,514 B2
(45) Date of Patent: Sep. 2, 2014

(54) MEASURING CRYSTAL SITE LIFETIME IN A NON-LINEAR OPTICAL CRYSTAL

(75) Inventor: J. Joseph Armstrong, Fremont, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 13/287,603

(22) Filed: Nov. 2, 2011

(65) Prior Publication Data

US 2012/0113995 A1 May 10, 2012

Related U.S. Application Data

(60) Provisional application No. 61/411,851, filed on Nov. 9, 2010.

(51) Int. Cl.
*H01S 3/10* (2006.01)

(52) U.S. Cl.
USPC .............................. 372/21; 372/22; 359/326

(58) Field of Classification Search
USPC ............................................ 372/21; 359/326
See application file for complete search history.

(56) References Cited

U.S. PATENT DOCUMENTS

| | | | |
|---|---|---|---|
| 6,101,022 A * | 8/2000 | Chen et al. | 359/330 |
| 6,157,444 A * | 12/2000 | Tomita et al. | 356/237.1 |
| 7,539,222 B2 | 5/2009 | Matsuki | |
| 2006/0072635 A1 | 4/2006 | Wang | |
| 2007/0014326 A1 * | 1/2007 | Wakabayashi et al. | 372/92 |
| 2007/0071042 A1 * | 3/2007 | Matsuki | 372/22 |
| 2010/0045974 A1 * | 2/2010 | Kaertner et al. | 356/218 |
| 2010/0085632 A1 * | 4/2010 | Henderson | 359/341.3 |
| 2010/0128343 A1 * | 5/2010 | Imai et al. | 359/326 |

FOREIGN PATENT DOCUMENTS

| | | |
|---|---|---|
| JP | 2009-145791 A | 7/2009 |
| JP | 2010219164 | 9/2010 |

* cited by examiner

*Primary Examiner* — Yuanda Zhang
(74) *Attorney, Agent, or Firm* — Suiter Swantz pc llo

(57) ABSTRACT

The present invention includes a fundamental laser light source configured to generate fundamental wavelength laser light, an optical crystal configured to receive fundamental laser light from the fundamental laser light source, the optical crystal configured to generate alternate wavelength light by frequency converting a portion of the received fundamental laser light to alternate wavelength light, an auxiliary light source configured to generate auxiliary wavelength light, the auxiliary wavelength light having a wavelength different from the fundamental wavelength laser light and the alternate wavelength light, the fundamental laser light source and the auxiliary light source oriented such that the fundamental laser light copropagates with the auxiliary light through a surface of the optical crystal, and a detector configured to detect at least one of fundamental wavelength laser light scattered by the optical crystal, alternate wavelength light scattered by the optical crystal, or auxiliary light scattered by the optical crystal.

23 Claims, 4 Drawing Sheets

MEASURING CRYSTAL SITE LIFETIME IN A NON-LINEAR OPTICAL CRYSTAL

CROSS-REFERENCE TO RELATED APPLICATION

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a regular (non-provisional) patent application of United States Provisional Patent Application entitled MEASURING CRYSTAL SITE LIFETIME IN FREQUENCY CONVERTED LASER, naming Joseph Armstrong as inventor, filed Nov. 9, 2010, application Ser. No. 61/411,851.

TECHNICAL FIELD

The present invention generally relates to a frequency converted light source suitable for implementation in an illuminator of a semiconductor wafer or photomask inspection system, and more particularly, to a system for monitoring frequency converted crystal site degradation.

BACKGROUND

As the dimensions of semiconductor devices and components continue to decrease, the demand for semiconductor wafer and photomask inspection systems exhibiting high throughput and improvements in resolution continue to increase. One manner in which higher levels of resolution are attained in semiconductor and photomask inspections systems includes the utilization of an illumination source capable of emitting shorter wavelength light.

Certain practical advantages may be achieved when illuminating a wafer or reticle with light having wavelengths at or below 400 nm. Providing suitable lasers for high quality wafer and photomask inspection systems presents a particular challenge. Conventional lasers capable of generating deep ultraviolet (DUV) light energy are typically large, expensive, and suffer from relatively short lifetimes and low average power output. In order to obtain adequate throughput and defect signal-to-noise ratio (SNR), wafer and photomask inspection systems generally require a laser based illumination source having high average power, low peak power, and relatively short.

Conventionally, the primary method for providing adequate DUV power entails converting long wavelength light to shorter wavelength light, referred to herein as "frequency conversion." It is well known in the art that frequency conversion from longer wavelength light to shorter wavelength is often accomplished utilizing one or more non-linear optical crystals. In this context, frequency conversion requires high peak power light in order to produce a nonlinear response in a given non-linear optical crystal. To increase the efficiency of this process the longer wavelength light may be generated to have high average power, short optical pulses, and may be focused into the optical crystal. The original light "longer wavelength" is commonly referred to as "fundamental light."

Generating light at wavelengths below 400 nm, and especially below 300 nm, is challenging. Light sources implemented in semiconductor inspection systems require relatively high powers, long lifetimes, and stable performance. Light sources meeting these requirements for advanced inspection techniques are nonexistent in the prior art. The lifetime, power, and stability of current DUV frequency converted lasers are generally limited by the implemented frequency conversion crystal and frequency conversion scheme. This is particularly true for non-linear conversion crystals exposed to DUV wavelengths, such as, but not limited to, 355, 266, 213, and 193 nm.

Many inspection applications require the frequency converted laser power or wavefront to remain stable over time. Due to degradation of the nonlinear optical crystal, as a result of exposure to the illumination, maintaining power and wavefront stability over time is challenging. In order to extend the lifetime of frequency conversion crystals, it is common to shift a given crystal such that an impinging laser beam focuses on an unused portion of the crystal prior to the degradation of a current location beyond acceptable limits. In another aspect, the optical crystal may be continuously shifted at a rate that prevents the onset of wavefront or power damage.

Lifetime of frequency conversion crystal sites, however, may vary significantly from crystal site to crystal site. The current method for dealing with variance in crystal site lifetime includes choosing a crystal site lifetime based on the shortest expected lifetime, with some safety margin included. This method may dramatically limit the lifetime of a given optical crystal. In addition, this method may suffer from incorrect estimations, as one or more crystal site locations may degrade faster than anticipated. This may adversely impact the performance of high precision equipment using this type of a laser as a light source Accordingly, it may be desirable to provide a method and/or system which provide a frequency conversion system equipped with crystal site lifetime monitoring capabilities.

SUMMARY

An apparatus suitable for laser frequency conversion with crystal site lifetime monitoring is disclosed. In one aspect, an apparatus may include, but is not limited to, a fundamental laser light source configured to generate fundamental wavelength laser light; at least one optical crystal configured to receive fundamental laser light from the fundamental laser light source, the at least one optical crystal configured to generate alternate wavelength light by frequency converting at least a portion of the received fundamental laser light to alternate wavelength light; and a detector configured to detect at least one of fundamental wavelength laser light scattered by the optical crystal or alternate wavelength light scattered by the optical crystal.

In another aspect, an apparatus for laser frequency conversion with crystal site lifetime monitoring is disclosed. The apparatus may include, but is not limited to, a fundamental laser light source configured to generate fundamental wavelength laser light; at least one optical crystal configured to receive fundamental laser light from the fundamental laser light source, the at least one optical crystal configured to generate alternate wavelength light by frequency converting at least a portion of the received fundamental laser light to alternate wavelength light; an auxiliary light source configured to generate auxiliary wavelength light, the auxiliary wavelength light having a wavelength different from a wavelength of the fundamental wavelength laser light and a wavelength of the alternate wavelength light, the fundamental laser light source and the auxiliary light source oriented such that at least a portion of fundamental laser light substantially copropagates with at least a portion of auxiliary light through one or more surfaces of the optical crystal; and a detector configured to detect at least one of fundamental wavelength laser light scattered by the optical crystal, alternate wavelength light scattered by the optical crystal, or auxiliary light scattered by the optical crystal.

In another aspect, an apparatus for laser frequency conversion with crystal site lifetime monitoring shift is disclosed. The apparatus may include, but is not limited to, a fundamental laser light source configured to generate fundamental wavelength laser light; at least one optical crystal configured to receive fundamental laser light from the fundamental laser light source, the at least one optical crystal configured to generate alternate wavelength light by frequency converting at least a portion of the received fundamental laser light to alternate wavelength light; an auxiliary light source configured to generate auxiliary wavelength light, the auxiliary wavelength light having a wavelength different from a wavelength of the fundamental wavelength laser light and a wavelength of the alternate wavelength light, the fundamental laser light source and the auxiliary light source oriented such that at least a portion of fundamental laser light substantially copropagates with at least a portion of auxiliary light through a first surface of the optical crystal; a beam characterization system configured to measure one or more characteristics of the auxiliary wavelength light; and a wavelength separation element configured to transmit auxiliary wavelength light from the optical crystal to the beam characterization system.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

Referring generally to FIGS. 1 through 4, systems for crystal site monitoring in a non-linear optical crystal are described in accordance with the present invention.

The present disclosure is directed to a system capable of monitoring the performance of a nonlinear optical crystal and predicting the failure condition of the nonlinear optical crystal. The system is further configured to translate the optical crystal such that a new crystal site is exposed to impinging fundamental light once a failure condition is predicted as imminent.

It is recognized herein that in implementing metrology systems typical focused laser beam diameters are on the order of 0.1 to 0.2 mm. Further, a typical optical crystal cross-section may be on the order of 5 mm by 5 mm. The combination of optical crystal cross-section and the laser beam diameter may produce, in a typical setting, approximately between 100 and 500 crystal sites. Further, crystal site lifetimes may range from hundreds of hours to less than one hour. Those skilled in the art should recognize that crystal site variation may depend on numerous factors including, but not limited to, the type of crystal implemented, the wavelengths of light implemented, and the power densities created by the laser light within the crystal. The ability to predict crystal site failure may extend the lifetime of each crystal site of a given optical crystal, resulting in reduced operating costs, shortened laser maintenance periods, and increased laser reliability.

Figure 1:
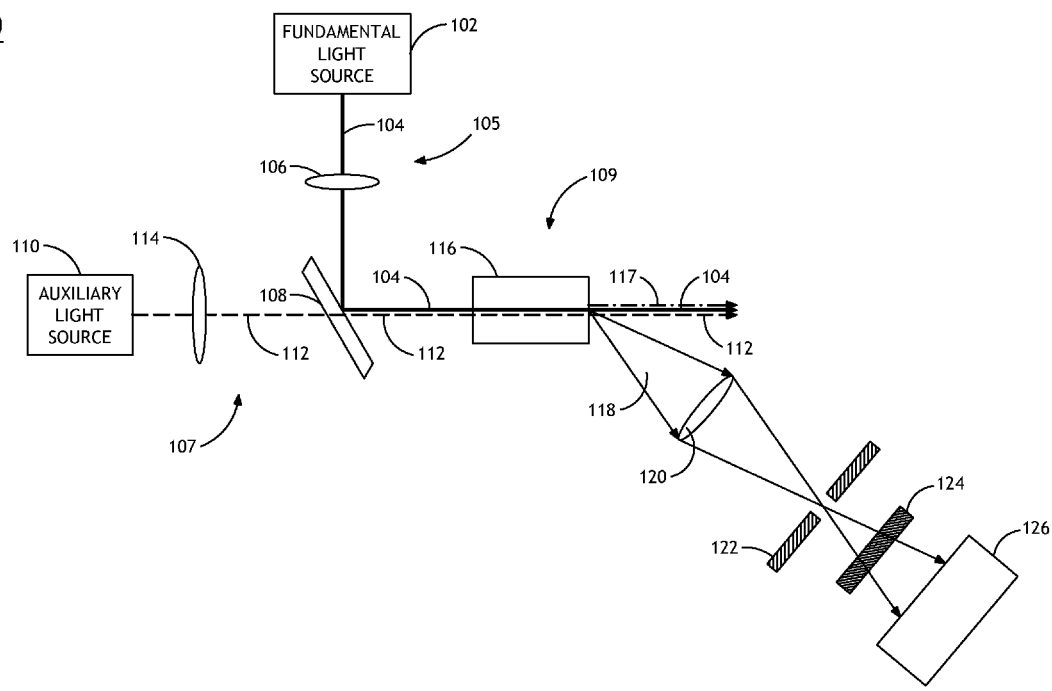
FIG. 1 illustrates a block diagram of an apparatus for laser frequency conversion with crystal site lifetime monitoring, in accordance with an embodiment of the present invention.

FIG. 1 illustrates a system 100 for crystal site monitoring in a non-linear optical crystal, in accordance with an embodiment of the present invention. In one aspect, the system 100 may include, but is not limited to, a fundamental laser light source 102 configured to generate laser light 104 of a fundamental wavelength, an auxiliary light source 106 configured to generate auxiliary light 112 having a wavelength different then the fundamental light, an optical crystal 116 configured to receive the fundamental laser light 104 and the auxiliary laser later 112, and a detector 126 configured to detect light scattered by the optical crystal 116. (e.g., fundamental wavelength laser light, alternate wavelength light or auxiliary light). In a further aspect, the optical crystal 116 is configured to frequency convert a portion of the fundamental light received by the optical crystal 116 to alternate wavelength light 117 (i.e., light having a wavelength different from the fundamental laser light).

In another aspect, the fundamental light source 102, the auxiliary light source 106, the optical crystal 116 and the various optical elements of the system 100 may be configured such that at least a portion of the auxiliary light 112 and the fundamental light 104 copropagate through an entrance surface of the optical crystal 116. In this manner, the fundamental light source 102 is configured to direct fundamental laser light 104 from the fundamental light source 102 onto a frequency conversion crystal site of the optical crystal 116, while the auxiliary light source 110 is configured to direct auxiliary light 112 from the auxiliary light source 110 onto the same frequency conversion crystal site (or at least a portion thereof).

It is recognized herein that a portion of the copropagating fundamental light 104 and auxiliary light 112, along with the generated alternate light 117, is transmitted through the volume of the optical crystal 116 and exits the optical crystal 116, as shown in FIG. 1. It is further recognized herein, however, that defects within the optical crystal 116, created by crystal site degradation, may scatter light out of the specular portions of the fundamental 104, auxiliary 112, and/or alternate 117 light beams. Measurement of a portion of this scattered light 118 via the detector 126 allows for the characterization of the level of crystal site degradation within the optical crystal 116. Characterization of the level of degradation in a given frequency conversion crystal site provides for more accurate prediction of frequency conversion crystal site failure.

It is contemplated herein that in many settings the scattering associated with the fundamental light 104 and the alternate light 117 may be of such large magnitude an adequate signal-to-noise ration cannot be achieved. The implementation of an auxiliary light source 110 capable of emitting auxiliary light 112 having a wavelength different than both the fundamental light 104 and the alternate light 117 may allow the characterization of one or more degradation sites using the auxiliary wavelength light 112. In this manner, the system 100 may be configured to detect only the auxiliary wavelength light 112 by implementing a filtering process prior to detection which filters the fundamental wavelength light 104 and the alternate wavelength light 1117 out of the detection pathway, as will be described in greater detail further herein.

In a general sense, the fundamental laser light source 102 may include any laser light source known in the art. The particular choice of wavelength of the fundamental laser light source 102 may depend on a variety of factors, including, but not limited to, the desired output wavelength of the alternate wavelength light generated by the non-linear response of the optical crystal 116. Further, the optical crystal 116 of the system 100 may include any non-linear optical crystal known in the art. Again, the particular choice of the non-linear optical crystal may depend on a variety of factors, including, but not limited to, the desired output wavelength of the alternate wavelength light generated by the non-linear response of the optical crystal 116. In this sense, the choice of the fundamental laser light source 102 and the optical crystal 116 are typically made in conjunction, wherein a particular set of fundamental laser light source and receiving non-linear optical crystal are chosen such that the pair produce the desired alternate wavelength light. The particular choice of the fundamental light source 102, the optical crystal 116, or the generated alternate wavelength light 117 are not limiting and it should be recognized that any choice of the above are within the scope of the present invention.

In addition, the particular choice of the auxiliary light source 110 should not be interpreted as a limitation. In a general sense, the auxiliary light source 110 is chosen such that the emitted auxiliary light 112 has a wavelength different from the fundamental wavelength light 104 and the alternate wavelength light 117, allowing for improved analysis, as discussed in greater detail further herein. It is recognized herein that the auxiliary light source 110 may include any light source known in the art. For example, the auxiliary light source 110 may include any light source capable of emitting a narrow band of illumination. It is noted herein that narrow band illumination may be achieved utilizing a broad band source in combination with one or more filtering devices. By way of another example, the auxiliary light source 110 may include one or more laser light sources (e.g., single laser or array of lasers). In yet another example, the auxiliary light source 110 may include one or more light emitting diodes (LEDs) (e.g., single LED or array of LEDs).

In another aspect of the present invention, the system 100 may include, but is not limited to, a first focusing element 106, a second focusing element 114, and a beam splitter (e.g., dichroic mirror 108) configured to direct light from the fundamental light source 102 and the auxiliary light source 106 to the optical crystal 116 via crystal pathway 109. In this manner, the first focusing element 106 may focus fundamental light 104 from the fundamental light source 102 onto a frequency conversion crystal site of the optical crystal 116, while the second focusing element 114 focuses auxiliary light 112 from the auxiliary light source 110 onto the same frequency conversion crystal site.

In one embodiment, the beam splitter may include a dichroic mirror 108. In this regard, a dichroic mirror 108 may be utilized to transmit illumination 112 from the auxiliary light source 110 toward the optical crystal 116, while reflecting illumination 104 from the fundamental light source 102 toward the optical crystal 116. It is noted herein that this configuration is not limiting, and should merely be interpreted as illustrative. For example, system 100 may be alternatively configured such that the dichroic mirror transmits illumination from the fundamental light source 102 toward the optical crystal 116, while reflecting illumination from the auxiliary light source 110 toward the optical crystal 116. Those skilled in the art will recognized that the specific configuration may depend on a variety of factors, including, but not limited to, the polarization and wavelength of the illumination from the chosen fundamental laser source 102 and the auxiliary light source 110.

In a general sense, any suitable beam splitter known in the art may be utilized within the context of the present invention. For the purposes of clarity, throughout the remainder of the present disclosure, the present invention will be described in the context of a dichroic mirror 108 based beam splitter. It should be recognized, however, that this description is not limiting and numerous other beam splitting technologies may be utilized within the scope of the present invention.

In another aspect of the present invention, the first focusing element 106 is disposed along a first optical pathway 105. The first focusing element 106 is configured to focus light 104 emanating from the fundamental laser light source 102 into the optical crystal 116. In this regard, the first focusing element 106 is disposed along the first optical pathway between the fundamental light source 102 and the dichroic mirror 108. In another embodiment, although not shown, the first focusing element 106 is disposed along the crystal pathway 109 between the beam splitter 108 and the optical crystal 116. It is noted herein that the arrangement described above relating to the position of the first focusing element 106 is not limiting and should merely be interpreted as illustrative in nature. In a further embodiment, the focusing elements 106 may include any optical devices known in the art suitable for focusing the fundamental laser light 104 emanating from the fundamental laser light source 102. For example, the first focusing element 106 may include, but is not limited to, a lens, a mirror, or a diffractive element.

It is contemplated herein that focusing of the fundamental laser light 104 is not a requirement of the system 100. In this sense, whether focusing of the fundamental laser light 104 is required may depend, for example, on the required beam size within the optical crystal 116.

In another embodiment, the second focusing element 114 is disposed along a second optical pathway 107. The second focusing element 114 is configured to focus light 112 emanating from the auxiliary light source 106 into the optical crystal 116. In this regard, the second focusing element 114 is disposed along the second optical pathway 107 between the auxiliary light source 110 and the dichroic mirror 108. In another embodiment, although not shown in FIG. 1, the second focusing element 114 is disposed along the crystal pathway 109 between the dichroic mirror 108 and the optical crystal 116. It is noted herein that the arrangement described above relating to the position of the second focusing element 114 is not limiting and should merely be interpreted as illustrative in nature.

In a further embodiment, the second focusing element 114 may include any optical device known in the art suitable for focusing the auxiliary light 106 emanating from the auxiliary light source 106. For example, the second focusing element 114 may include, but is not limited to, a lens, a mirror, or a diffractive element.

It is contemplated herein that focusing of the auxiliary light 112 is not a requirement of the system 100. Whether focusing of the auxiliary light 112 is required may depend, for example, on the size of the beam required within the optical crystal 116. In a general sense, it is desirable to produce an auxiliary light beam 112 having a size approximately the same as the fundamental light beam 104. Utilizing the same, or at least similar, sized fundamental and auxiliary light beams enables the system 100 to achieve significant overlap between the fundamental laser beam 104 and the auxiliary light beam 112 at a given frequency conversion crystal site of the optical crystal 116. Overlap between the fundamental laser beam 104 and the auxiliary light beam 112 may aid in creating an adequate signal associated with the defects of the crystal. In this manner, an auxiliary light beam 112 that is coextensive with the fundamental light beam 104 allows the system to more precisely measure effects of crystal site degradation, through measurement of the scattered auxiliary light, due to fundamental light exposure.

While the configuration depicted in FIG. 1 is suitable for second harmonic generation, it is recognized herein that other types of frequency conversion or frequency mixing process may be implemented within the scope of the present invention.

In another aspect of the present invention, the detector 126 is configured to collect scattered light 118 from the optical crystal 116. As noted previously herein, the specular portions of the fundamental laser beam 104, auxiliary light beam 112, and generated alternate light 117 may exit the optical crystal 116 together, as illustrated in FIG. 1. Defects within the optical crystal 116, however, may scatter light out of the specular portions of the fundamental 104, auxiliary 112, and/or alternate 117 light beams. These defects may be the created by the degradation of the frequency conversion crystal site as a result of fundamental laser light 104 exposure. Upon scattering off of the generated defects, portions of the fundamental 104, auxiliary 112, and/or alternate 117 light beams may be diverted along a direction arranged at some angle with respect to the crystal pathway 109. In this manner, fundamental 104, auxiliary 112, and/or alternate 117 light may form a scattered beam 118, which may include some combination of the fundamental, auxiliary and/or alternate light.

The detector may include any detector known in the art. For example, the detector 126 may include, but is not limited to, a photodiode (e.g., silicon photodiode), a photomultiplier tube (PMT), or a charge coupled device (CCD). In a general sense, the particular detector type used should be highly sensitive to low levels of the illumination sought to be detected. For example, the detector 126 may include a detector highly sensitive to low levels of light emitted from the chose auxiliary light source 110.

In a further embodiment, the system 100 may include one or more sets of collection optics 120. The collection optics 120 of the present invention may include any collection optics known in the art. For example, the collection optics 120 may include, but are not limited to, one or more lenses or one or more mirrors. As shown in FIG. 1, the collection optics 120 may be arranged to collect the light 118 scattered from the optical crystal 116 (e.g., scattered via degraded frequency conversion crystal sites) and direct the scattered light 118 toward the detector 126.

In another embodiment, the system 100 may include an aperture 122. It is recognized herein that the aperture 122 may include any aperture known in the art. The aperture 122 may be arranged such that the light from the collection optics 120 passes through the aperture 122. In this regard, the collection optics 120 effectively images the scattered light 118 (consisting of the scattered fundamental laser light, scattered alternate light, and scattered auxiliary light) at the detector 126 using the aperture 122 as a pass through, as shown graphically in FIG. 1. It is recognized herein that this arrangement should dramatically reduce the amount stray light originating from other locations with the system 100.

In a further embodiment, the system 100 may include a filter 124 arranged between the aperture 122 and the detector 126. It is recognized herein that the filter 124 may include any optical filter known in the art. For example, the filter 124 may include, but is not limited to, an interference filter or an absorption filter. Further, the filter 124 may be configured to filter out all wavelengths except for the wavelength of the auxiliary light source 110. In this sense, the filter 124 may act to limit transmission of scattered fundamental light and alternate light produced by the optical crystal 116. It is further noted herein that in many instances scattering associated with the fundamental light 104 and the alternate light 117 may be large enough within the system that an adequate signal-to-noise ratio is unachievable. The implementation of an auxiliary light source 110 configured to emit auxiliary light 112 having a wavelength different than both the fundamental light 104 and the alternate light 117 allows for the filtering of the scattered light 118 such that only the auxiliary light 112 reaches the detector 126.

It is recognized herein that the collection optics 120, the aperture 122, and the filter 124 described above may be implemented simultaneously, allowing for the efficient collection and filtering of the scattered light 118.

In another aspect of the present invention, the system 100 may include a computer system communicatively coupled to the detector 126 and configured to receive detection results from the detector 126. For example, the detector 126 may transmit one or more signals (e.g., wireless or wireline digitized signals) indicative of the one or more detection results of detector 126 to a computer system (not shown).

Upon receiving the detection results from the detector 126, the computer system may execute a pre-programmed algorithm configured to determine the level of frequency conversion crystal site degradation of given crystal site. For example, the algorithm may be configured to compare acquired scattered light 118 intensity, as measured by detector 126, to standardized reference data suitable for correlating scattering intensity 118 to a given level of degradation. The computer algorithm may further be configured to provide an indication as to the amount of time remaining before a failure condition of the given crystal site is reached. This indication may be provided to a sub-system of the system 100 or a user, via a user display interface.

In another embodiment, the computer system may transmit control instructions to a translation control system (not shown). In this regard, upon identifying an imminent failure of a given crystal site, the computer system may send a translation command to a communicatively coupled translation control system. In response to the command signals, the translation control system may translate the optical crystal 116 by a selected amount such that the fundamental laser beam 104 and the auxiliary light beam 112 are impinging on a portion of the optical crystal 116 not previously degraded.

It is recognized herein that the translation control system may include, a multi-axis translation stage. It should be noted that any known multi-axis translation stage may be suitable for implementation in the present invention. For example, the multi-axis translation stage may include, but is not limited to, a motorized multi-axis translation stage or a piezoelectric driven translation stage. Further, the optical crystal 116 may be mechanically coupled to the multi-axis stage of the translation control system in any manner known in the art.

The computer system may include, but is not limited to, a personal computer system, mainframe computer system, workstation, image computer, parallel processor, or any other device known in the art. In general, the term "computer system" may be broadly defined to encompass any device having one or more processors, which execute instructions from a memory medium.

Program instructions implementing methods such as those described herein may be transmitted over or stored on carrier medium. The carrier medium may be a transmission medium such as a wire, cable, or wireless transmission link. The carrier medium may also include a storage medium such as a read-only memory, a random access memory, a magnetic or optical disk, or a magnetic tape.

Figure 2:
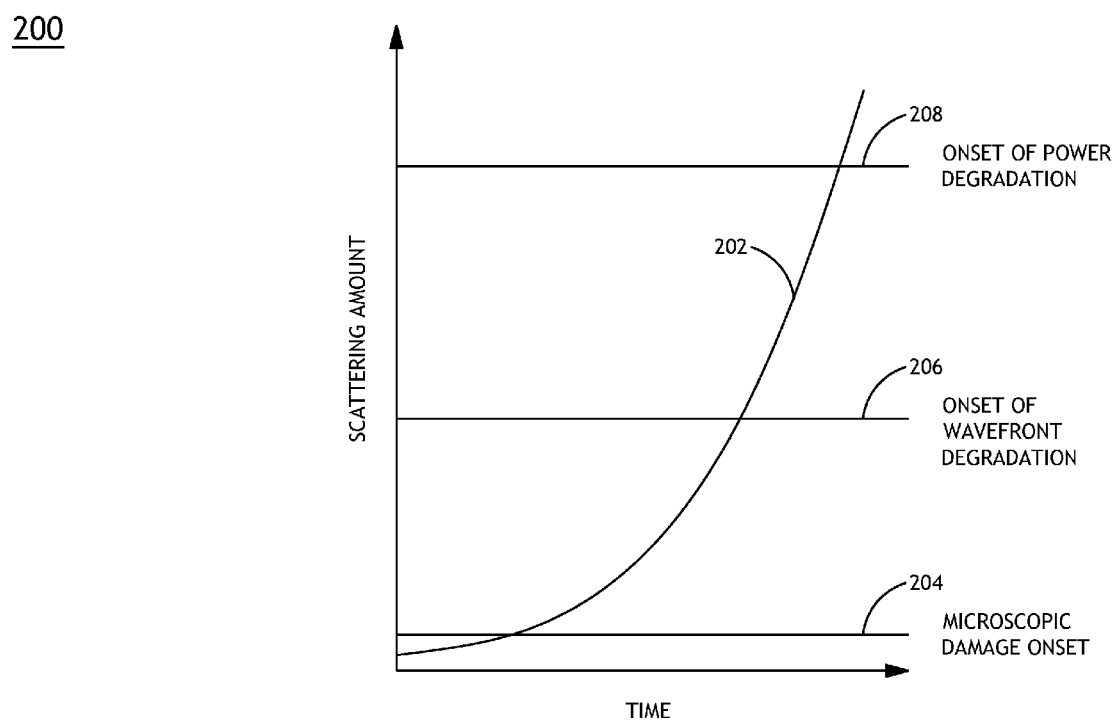
FIG. 2 illustrates defect generated auxiliary light scattering measurements obtained using an apparatus for laser frequency conversion with crystal site lifetime monitoring, in accordance with an embodiment of the present invention.

FIG. 2 illustrates a set of scattering measurement results displaying onset of damage, onset of wavefront degradation, and onset of power degradation. It is recognized herein that the degradation of a frequency conversion crystal impacts the ability of the crystal to generate alternate light. The degradation of crystal sites within the crystal impacts the conversion capabilities of the optical crystal in two primary ways. In many instances, thermal effects and photorefraction cause a change in the wavefront of light emerging form a given optical crystal. It is further noted that detrimental impact on the wavefront of light emitted by the crystal may occur before significant power degradation is observed. At longer exposure times, the power of emitted light may also start to degrade. It is recognized, however, that the scattered light signal may be more sensitive to crystal damage. FIG. 2 illustrates the level of scattered light detected by an implemented detections system (e.g., system 100, system 300, or system 400 of the present disclosure) as a function of time. Initially (at small time), there is a very low level of scattered background light detected. As time increases, the scattered light signal increases above the noise threshold and an onset of microscopic damage 204 is observed. It is noted herein that the onset of microscopic damage does not significantly impact the power or wavefront of the generated alternate light because the impinging fundamental light beam diameter within the crystal is significantly larger than the microscopic damage. As time progresses even further, the scattering increases until the threshold for wavefront degradation 206 is reached. It is recognized here that this threshold must be chosen as a function of the importance of wavefront degradation to the implementing system. It is recognized herein that in many settings wavefront is not critical with power being the primary concern. In these settings, where wavefront degradation is unimportant, crystal sites of the optical critical typically last longer, until an onset of power degradation 208 is observed.

Figure 3:
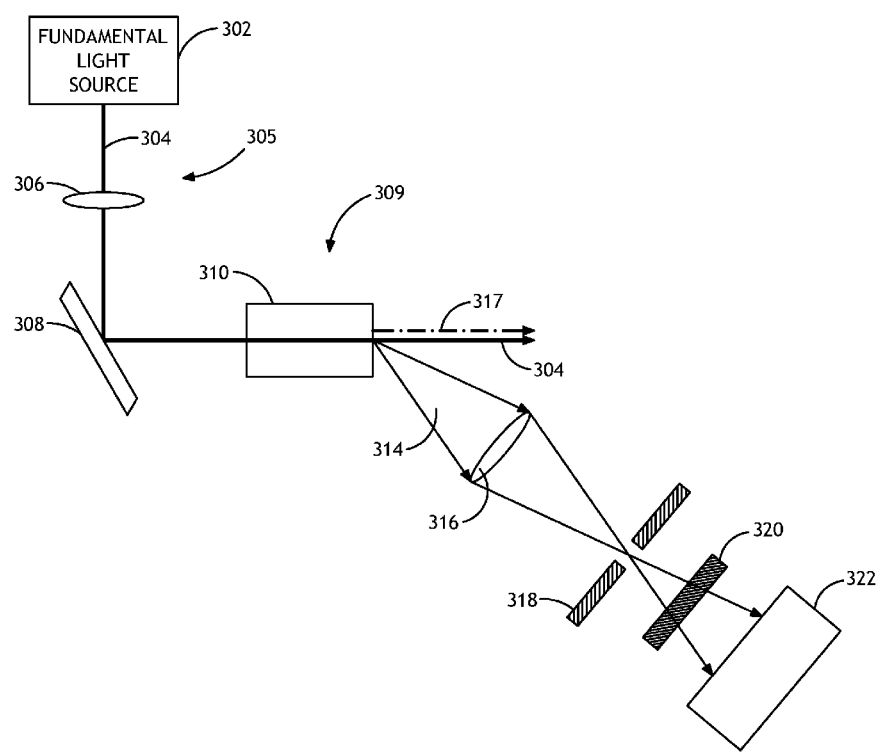
FIG. 3 illustrates a block diagram of an apparatus for laser frequency conversion with crystal site lifetime monitoring, in accordance with an alternative embodiment of the present invention.

FIG. 3 illustrates a system 300 for crystal site monitoring in a non-linear optical crystal, in accordance with an alternative embodiment of the present invention. The system 300 may include, but is not limited to, a fundamental laser light source 302 configured to generate laser light 304 of a fundamental wavelength, an optical crystal 310 configured to receive the fundamental laser light 304, and a detector 322 configured to detect light scattered by the optical crystal 116. (e.g., fundamental wavelength laser light or alternate wavelength light). Further, the system 300 may include a focusing element 306 and dichroic mirror 308 configured to direct and focus illumination from the fundamental laser source 302 to the optical crystal 116. It should be recognized herein that the dichroic mirror 308 of system 300 is not a requirement of the system 300. In addition, the system 300 may include collection optics 316, an aperture 318, and a filter 320 configured to collect and filter a portion of the scattered light 314 prior to the scattered light 314 impinging the detector 322.

It is recognized herein that the fundamental laser light source 302, the optical crystal, the detector 322, the focusing element 306, the dichroic mirror 308, the collection optics 316, the aperture 318, and the filter 320 of FIG. 3 are similar to the like components of FIG. 1 described previously herein. As such, the description of system 100 should be interpreted to extend to system 300 except where otherwise provided.

It is noted herein that the system 300 lacks the auxiliary light source illustrated in system 100. In this sense, the scattered light 314 scattered from a given frequency conversion crystal site defect is limited to the wavelengths of light provided by the fundamental light source 302 and the alternate light 317 generated by the non-linear response of the optical crystal 310 to the fundamental light 304.

In one aspect, the detector 322 may be configured to detect either the scattered fundamental light or the scattered alternate light. In a further embodiment, the filter 320 may be configured to transmit only a selected wavelength of interest, wherein the wavelength of interest consists of either the wavelength of the fundamental laser light 104 or the wavelength of the alternate light 317.

The particular choice of which wavelength to detect (or rather which wavelength to filter out using filter 320) may depend on several factors. In one sense, the choice of wavelength may depend on the signal-to-noise level that may be achieved within the system. It is recognized herein that short wavelength light generally scatters from defects more readily. Thus, in one sense, shorter wavelength light is a desirable choice. In contrast, however, the intensity of the available shorter wavelength light may be less than desirable or the contribution from stray light sources may make the shorter wavelength choice difficult to utilize (e.g., stray light sources may have wavelength same as shorter wavelength choice, thus making it impossible to filter out stray light). As such, the particular decision as to whether to detect the fundamental light scattering or alternate light scattering may depend on several variables, with the optimal choice being the scattered light which provides the best signal-to-noise ratio.

Figure 4:
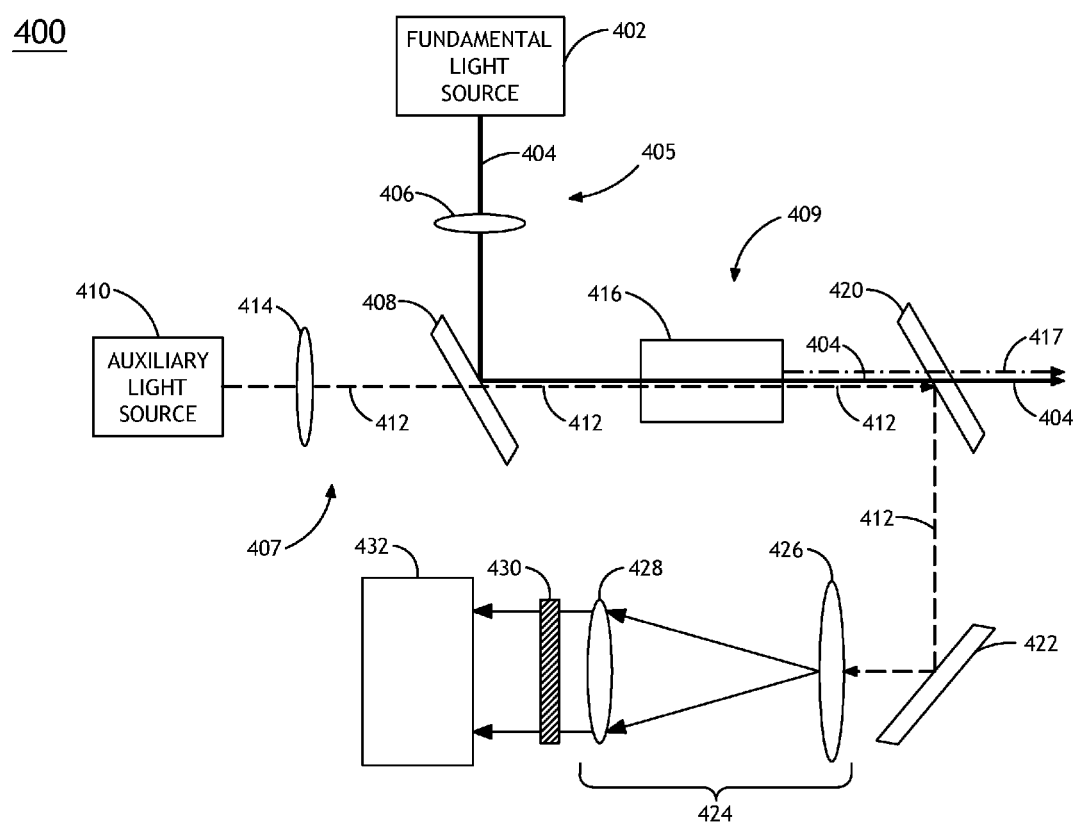
FIG. 4 illustrates a block diagram of an apparatus for laser frequency conversion with crystal site lifetime monitoring, in accordance with an alternative embodiment of the present invention.

FIG. 4 illustrates a system 400 for crystal site monitoring in a non-linear optical crystal, in accordance with an alternative embodiment of the present invention. The system 400 may include, but is not limited to, a fundamental laser light source 402 configured to generate laser light 404 of a fundamental wavelength, an auxiliary light source 410 configured to provide auxiliary wavelength light 412 having a wavelength different from the fundamental light 404, and an optical crystal 416 configured to receive the fundamental laser light 404 and the auxiliary wavelength light 412. Further, the system 400 may include a first focusing element 406, a second focusing element 414 and dichroic mirror 408 configured to direct and focus illumination from the fundamental laser source 402 and the auxiliary light source 410 to the optical crystal 116.

It is recognized herein that the fundamental laser light source 402, the auxiliary light source 410, the optical crystal 416, the focusing elements 406 and 414, and the dichroic mirror 408 are similar to the like components of FIG. 1 described previously herein. As such, the description of system 100 should be interpreted to extend to system 400 except where otherwise provided.

In one embodiment, the system 400 may include a wavelength separation element 420 configured to direct the auxiliary wavelength light 412 toward the measurement arm of the system 400. In this manner, the wavelength separation device 420 may be configured to transmit the fundamental laser light 404 and the alternate light 417 after emergence from the optical crystal 416. Conversely, the wavelength separation device 420 may be configured to reflect the auxiliary wavelength light 412. In this regard, the wavelength separation device 420 may be arranged to pass through the fundamental laser light 404 and alternate light 417, while reflecting the auxiliary light 417 toward the measurement arm of the system 400.

[types of separators] The wavelength separation element 420 may include any wavelength separation device known in the art suitable to separation illumination of the auxiliary wavelength from the fundamental and alternate light. For example, the wavelength separation element 420 may include, but is not limited to, a dichroic mirror, a prism, a diffractive element, or the like.

[beam characterization system] In another aspect of the present invention, the system 400 may include a beam characterization system 432 configured to measure one or more characteristics of the beam of auxiliary wavelength light 412. In this regard, the wavelength separator 420 may be utilized to separate the auxiliary wavelength light from the beam of light that emerges from the optical crystal 416 and direct the auxiliary wavelength light 412 toward the beam characterization system 432.

Further, the beam characterization system 432 may be configured to measure the wavefront of the auxiliary wavelength light 412 or one or more beam profile parameters (e.g., M2 factor, diameter, divergence and etc.) of the auxiliary wavelength light 412.

In one embodiment, the beam characterization system 432 may include one or more wavefront sensing device. It is noted herein that the wavefront sensing device may include any wavefront measuring device known in the art. For example, the wavefront measuring device may include a wavefront sensor. Those skilled in the art should recognize that a wavefront sensor may include an array of lenses or an array of apertures aligned with an array of sensing elements of an electronic light detection device (e.g., CCD). For instance, the wavefront measuring device may include a Hartmann-Shack based wavefront sensor. In another embodiment, the wavefront measurement device may include an interferometer. It is noted herein that any interferometric based system suitable for wave front sensing is suitable for implementation in the present invention. For example, the wavefront measurement device may include a common path interferometer, a shearing interferometer (with which the Hartmann-Shack wavefront sensor is based), a Fizeau interferometer, or a Michelson interferometer.

In another embodiment, the beam characterization system may include a beam profile measurement system. In a general sense, any beam profile measurement system known in the art is suitable for implementation in the present invention. In some embodiments, the beam profile measurement system may be configured to measure at least one of the beam propagation factor (i.e., the M2 factor), beam diameter, beam divergence, and etc.

In a further embodiment, the beam profile measurement system may include, but is not limited to, a means to measure the beam profile of the auxiliary light 412 by scanning transversely across the beam 412 of the auxiliary wavelength light. For example, the beam profile measurement system may include a knife edge configured to scan transversely across a beam of the auxiliary wavelength light. By way of another example, the beam profile measurement system may include an aperture configured to scan transversely across a beam of the auxiliary wavelength light. In an additional example, the beam profile measurement system may include a slit configured to scan transversely across a beam of the auxiliary wavelength light.

In a further embodiment, the beam profile measurement system is further configured to measure the beam profile of the auxiliary wavelength light at two or more locations through a focus in order to determine one or more beam properties of the auxiliary wavelength. For example, the beam profile measurement system may measure the beam profile of the auxiliary wavelength light at two or more locations through a focus in order to determine at least one of the focus, astigmatism, or tilt of the auxiliary wavelength light 412.

It should be recognized by those skilled in the art that a single beam characterization system 432 is may be configured to simultaneously determine both the wavefront of the auxiliary wavelength beam and the one or more beam profile parameters. For instance, a Hartmann-Shack based wavefront sensor is capable of determining wavefront and various beam profile parameters (e.g., M2 factor) of a measured beam simultaneously.

In another embodiment, the system 400 may include a turning mirror 422. The turning mirror 422 may be configured to redirect light transmitted from the wavelength separator device 420 toward the sensor 432. It is recognized herein that the turning mirror 422 is not a fundamental requirement of the system 400 and is included in FIG. 4 merely for illustrative purposes.

[telescope] In another embodiment, the system 400 may include a magnifying telescope 424 configured to project at least a portion of the auxiliary wavelength light 412 onto the beam characterization system 432. The magnifying telescope 424 may include optical focusing elements 426 and 428. It is recognized herein that the focusing elements 426 and 428 of the telescope 424 may include any focusing device known in the art. For example, each of the focusing elements 426 and 428 may include, but is not limited to, a lens or a mirror.

[filter 430] In a further embodiment, the system 400 may include a filter 430 configured to filter out light other than the auxiliary wavelength light 412. In this manner, the filter 430 may act to minimize the amount of non-auxiliary wavelength light which impinges on the beam characterization system 432. It is recognized herein that the filter 430 may include any filter known in the art capable of allowing the auxiliary wavelength light 412 to pass through, while filtering other wavelengths of light.

In another aspect, the system 400 may include a computer system communicatively coupled to the beam characterization system 432 and configured to receive results from the beam characterization system 432. For example, the beam characterization system 432 may transmit one or more signals (e.g., wireless or wireline digitized signals) indicative of the one or more results of beam characterization system 432 to a computer system (not shown).

Upon receiving the results from the beam characterization system 432, the computer system may execute a pre-programmed algorithm configured to determine the level of frequency conversion crystal site degradation of given crystal site. For example, the algorithm may be configured to compare acquired wavefront information and/or beam profile parameters, as measured by beam characterization system 432, to standardized reference data suitable for correlating the measured illumination to a given level of degradation. The computer algorithm may further be configured to provide an indication as to the amount of time remaining before a failure condition of the given crystal site is reached. This indication may be provided to a sub-system of the system 400 or a user, via a user display interface.

In another embodiment, the computer system may transmit control instructions to a translation control system (not shown). In this regard, upon identifying an imminent failure of a given crystal site, the computer system may send a translation command to a communicatively coupled translation control system. In response to the command signals, the translation control system may translate the optical crystal 416 by a selected amount such that the fundamental laser beam 404 and the auxiliary light beam 412 are impinging on a portion of the optical crystal 416 not previously degraded.

It is recognized herein that the translation control system may include, a multi-axis translation stage. It should be noted that any known multi-axis translation stage may be suitable for implementation in the present invention. For example, the multi-axis translation stage may include, but is not limited to, a motorized multi-axis translation stage or a piezoelectric driven translation stage. Further, the optical crystal 416 may be mechanically coupled to the multi-axis stage of the translation control system in any manner known in the art.

All of the system and methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

Furthermore, it is to be understood that the invention is defined by the appended claims.

What is claimed:

1. An apparatus for laser frequency conversion with crystal site lifetime monitoring, comprising:
    a fundamental laser light source configured to generate fundamental wavelength laser light;
    at least one optical crystal configured to receive fundamental laser light from the fundamental laser light source, the at least one optical crystal configured to generate alternate wavelength light by frequency converting at least a portion of the received fundamental laser light to alternate wavelength light;
    an auxiliary light source configured to generate auxiliary wavelength light, the auxiliary wavelength light having a wavelength different from a wavelength of the fundamental wavelength laser light and a wavelength of the alternate wavelength light, the fundamental laser light source and the auxiliary light source oriented such that at least a portion of fundamental laser light substantially copropagates with at least a portion of auxiliary light through one or more surfaces of the optical crystal;
    a detector configured to detect auxiliary light scattered by the optical crystal;
    one or more filters positioned between the optical crystal and the detector, the one or more filters configured to block the fundamental wavelength laser light and the alternative wavelength light scattered from a frequency conversion site of the at least one optical crystal, the one or more filters configured to substantially transmit the auxiliary light scattered by the frequency conversion site of the optical crystal; and
    a computer system communicatively coupled to the detector, wherein the computer system is configured to:
        receive one or more detection results from the detector; and
        compare the received one or more detection results to a selected set of calibrated reference data; and
        determine an amount of time prior to a failure condition of the frequency conversion site of the at least one optical crystal based on the comparison between the received one or more detection results of the auxiliary light and the selected set of calibrated reference data.

2. The apparatus of claim 1, further comprising:
    a multi-axis translation control system communicatively coupled to the computer system, wherein the multi-axis translation control system is configured to translate the at least one optical crystal in response to a determination of an imminent failure condition of the frequency conversion site of the at least one optical crystal.

3. The apparatus of claim 1, wherein the auxiliary light source comprises:
    a laser light source.

4. The apparatus of claim 1, further comprising:
    one or more optical collection elements positioned between the optical crystal and the detector, the one or more optical collection elements being configured to collect at least one of the fundamental wavelength laser light scattered by the optical crystal, the alternate wavelength light scattered by the optical crystal, or the auxiliary light scattered by the optical crystal.

5. The apparatus of claim 1, further comprising:
    one or more intermediate focusing elements positioned between the optical crystal and the detector, the one or more intermediate focusing elements being configured to focus at least one of the fundamental wavelength laser light scattered by the optical crystal, the alternate wavelength light scattered by the optical crystal, or the auxiliary light scattered by the optical crystal to an intermediate focus.

6. The apparatus of claim 5, further comprising:
    an aperture positioned substantially at the location of the intermediate focus, the aperture being configured to limit light contamination at the detector.

7. The apparatus of claim 1, wherein the detector is further configured to detect at least one of fundamental wavelength laser light scattered by the optical crystal and alternate wavelength light scattered by the optical crystal.

8. An apparatus for laser frequency conversion with crystal site lifetime monitoring, comprising:
    a fundamental laser light source configured to generate fundamental wavelength laser light;
    at least one optical crystal configured to receive fundamental laser light from the fundamental laser light source, the at least one optical crystal configured to generate alternate wavelength light by frequency converting at least a portion of the received fundamental laser light to alternate wavelength light;
    an auxiliary light source configured to generate auxiliary wavelength light, the auxiliary wavelength light having a wavelength different from a wavelength of the fundamental wavelength laser light and a wavelength of the alternate wavelength light, the auxiliary light source configured to direct auxiliary wavelength light onto a crystal conversion site of the optical crystal, the at least one optical crystal configured to transmit auxiliary light scattered from the optical crystal, the scattered auxiliary light having a wavelength substantially the same as the generated auxiliary light;
    a detector configured to detect at least one of fundamental wavelength laser light scattered by the optical crystal, alternate wavelength light scattered by the optical crystal, and the auxiliary light scattered by the optical crystal; and
    one or more filters positioned between the at least one optical crystal and the detector, the one or more filters configured to block the fundamental wavelength laser light and the alternative wavelength light scattered from a frequency conversion site of the at least one optical crystal, the one or more filters configured to substantially transmit the auxiliary light scattered by the frequency conversion site of the optical crystal; and
    a computer system communicatively coupled to the detector, wherein the computer system is configured to:
        receive one or more detection results from the detector; and
        compare the received one or more detection results to a selected set of calibrated reference data; and
        determine an amount of time prior to a failure condition of the frequency conversion site of the at least one optical crystal based on the comparison between the received one or more detection results of the auxiliary light and the selected set of calibrated reference data.

9. The apparatus of claim 8, further comprising:
    one or more optical collection elements positioned between the optical crystal and the detector, the one or more optical collection elements being configured to collect at least one of the fundamental wavelength laser light scattered by the optical crystal, the alternate wavelength light scattered by the optical crystal, and the auxiliary light scattered by the optical crystal.

10. The apparatus of claim 8, further comprising:
    one or more intermediate focusing elements positioned between the optical crystal and the detector, the one or more intermediate focusing elements being configured to focus at least one of the fundamental wavelength laser light scattered by the optical crystal, the alternate wavelength light scattered by the optical crystal, and the auxiliary light scattered by the optical crystal.

11. The apparatus of claim 10, further comprising:
an aperture positioned substantially at the location of the intermediate focus, the aperture being configured to limit light contamination at the detector.

12. An apparatus for laser frequency conversion with crystal site lifetime monitoring, comprising:
a fundamental laser light source configured to generate fundamental wavelength laser light;
at least one optical crystal configured to receive fundamental laser light from the fundamental laser light source, the at least one optical crystal configured to generate alternate wavelength light by frequency converting at least a portion of the received fundamental laser light to alternate wavelength light;
an auxiliary light source configured to generate auxiliary wavelength light, the auxiliary wavelength light having a wavelength different from a wavelength of the fundamental wavelength laser light and a wavelength of the alternate wavelength light, the fundamental laser light source and the auxiliary light source oriented such that at least a portion of fundamental laser light substantially copropagates with at least a portion of auxiliary light through a first surface of the optical crystal;
a beam characterization system configured to measure one or more characteristics of the auxiliary wavelength light;
a wavelength separation element configured to transmit the auxiliary wavelength light from the optical crystal to the beam characterization system;
a computer system communicatively coupled to the beam characterization system, wherein the computer system is configured to:
receive one or more measurement results from the beam characterization system;
compare the received one or more measurement results of the auxiliary wavelength light to a selected set of calibrated reference data; and
determine an amount of time prior to a failure condition of the frequency conversion site of the at least one optical crystal based on the comparison between the received one or more measurement results from the beam characterization system and the selected set of calibrated reference data; and
a multi-axis translation control system communicatively coupled to the computer system, wherein the multi-axis translation control system is configured to translate the at least one optical crystal in response to a determination of an imminent failure condition of the frequency conversion site of the at least one optical crystal.

13. The apparatus of claim 12, wherein the wavelength separation element comprises at least one of a dichroic mirror, a prism or a diffractive element.

14. The apparatus of claim 12, wherein the beam characterization system comprises:
at least one wavefront sensing device configured to sense a wavefront of the auxiliary wavelength.

15. The apparatus of claim 14, wherein the at least one wavefront sensing device comprises:
at least one wavefront sensor.

16. The apparatus of claim 14, wherein the at least one wavefront sensing device comprises:
an interferometer.

17. The apparatus of claim 12, wherein the beam characterization system comprises:
a beam profile measurement system configured to measure one or more beam profile parameters of the auxiliary wavelength light.

18. The apparatus of claim 17, wherein the one or more beam profile parameters comprise at least one of beam propagation factor, beam diameter, or beam divergence.

19. The apparatus of claim 17, wherein the beam profile measurement system configured to measure one or more beam profile parameters of the auxiliary wavelength light comprises:
a knife edge configured to scan transversely across a beam of the auxiliary wavelength light.

20. The apparatus of claim 17, wherein the beam profile measurement system configured to measure one or more beam profile parameters of the auxiliary wavelength light comprises:
an aperture configured to scan transversely across a beam of the auxiliary wavelength light.

21. The apparatus of claim 17, wherein the beam profile measurement system comprises:
a slit configured to scan transversely across a beam of the auxiliary wavelength light.

22. The apparatus of claim 17, wherein the beam profile measurement system is configured to measure the beam profile of the auxiliary wavelength light at two or more locations through a focus in order to determine one or more beam properties of the auxiliary wavelength scattered by the optical crystal.

23. The apparatus of claim 22, wherein the one or more beam properties comprises at least one of focus, astigmatism, or tilt.

* * * * *